United States Patent [19]

Shimizu et al.

[11] Patent Number: 5,031,034
[45] Date of Patent: Jul. 9, 1991

[54] IMAGE FORMING AND PROCESSING APPARATUS WITH IDENTIFICATION OF CHARACTER PORTIONS OF IMAGES

[75] Inventors: Masatomo Shimizu, Yokohama; Yoshinori Ikeda, Tokyo; Tetsuya Ohnishi, Yokohama, all of Japan

[73] Assignee: Canon Kabushiki Kaisha, Tokyo, Japan

[21] Appl. No.: 367,673

[22] Filed: Jun. 19, 1989

[30] Foreign Application Priority Data

Jun. 20, 1988 [JP] Japan .................... 63-151541
Aug. 31, 1988 [JP] Japan .................... 63-216948

[51] Int. Cl.⁵ .................................................. H04N 1/46
[52] U.S. Cl. ........................................ 358/79; 358/80
[58] Field of Search ............... 358/75, 79, 80, 453, 358/454, 465, 466, 464; 382/48, 22

[56] References Cited

U.S. PATENT DOCUMENTS

| 4,626,902 | 12/1986 | Yamada ........................... 358/455 |
| 4,700,399 | 10/1987 | Yoshida .............................. 358/79 |
| 4,750,209 | 6/1988 | Shimura et al. ................... 382/48 |
| 4,751,585 | 6/1988 | Shibazaki .......................... 358/464 |
| 4,782,399 | 11/1988 | Sato .................................. 358/456 |
| 4,800,442 | 1/1989 | Riseman et al. .................. 358/280 |
| 4,812,903 | 3/1989 | Wagensonner et al. |
| 4,847,654 | 7/1989 | Honma et al. ..................... 358/300 |
| 4,876,612 | 10/1989 | Honma et al. ..................... 358/474 |
| 4,878,125 | 10/1989 | Katayama et al. ................ 358/456 |
| 4,887,150 | 12/1989 | Chiba et al. ....................... 358/80 |
| 4,982,277 | 1/1991 | Katoh et al. ....................... 358/80 |

FOREIGN PATENT DOCUMENTS

| 187534 | 7/1986 | European Pat. Off. . |
| 210467 | 2/1987 | European Pat. Off. . |
| 220903 | 5/1987 | European Pat. Off. . |
| 270090 | 6/1988 | European Pat. Off. . |
| 3629396 | 3/1988 | Fed. Rep. of Germany . |
| 1-241978 | 9/1989 | Japan ...................................... 358/75 |
| 2170373A | 7/1986 | United Kingdom . |

Primary Examiner—Howard W. Britton
Assistant Examiner—Kim Yen Vu
Attorney, Agent, or Firm—Fitzpatrick, Cella, Harper & Scinto

[57] ABSTRACT

A color image forming apparatus including; a discriminating circuit for discriminating a character portion of an object color image; a color image forming device for forming a color image, and able to change the image forming resolution; and a control circuit for causing change of the resolution of the color image forming device in accordance with the discrimination result provided by the discriminating circuit.

19 Claims, 9 Drawing Sheets

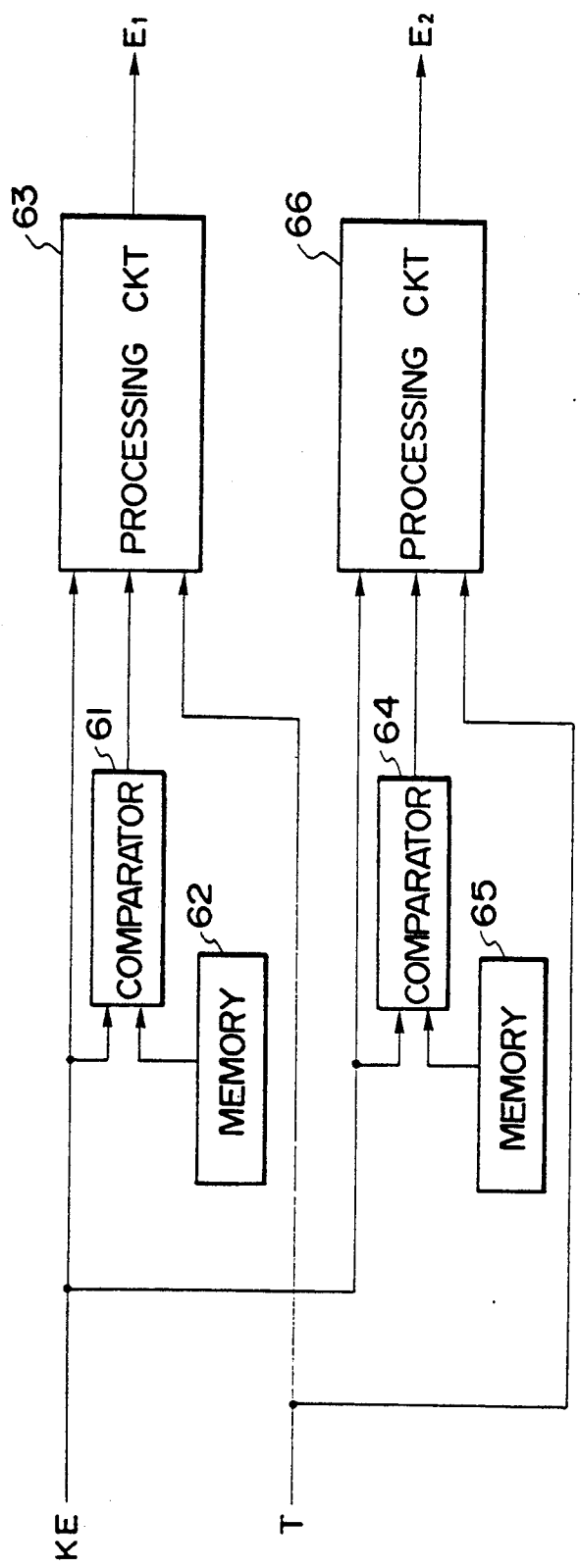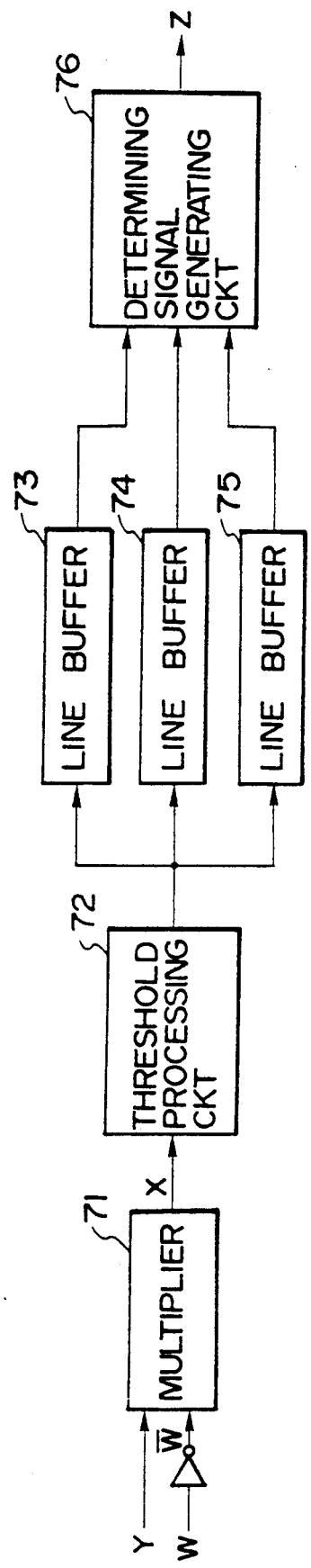

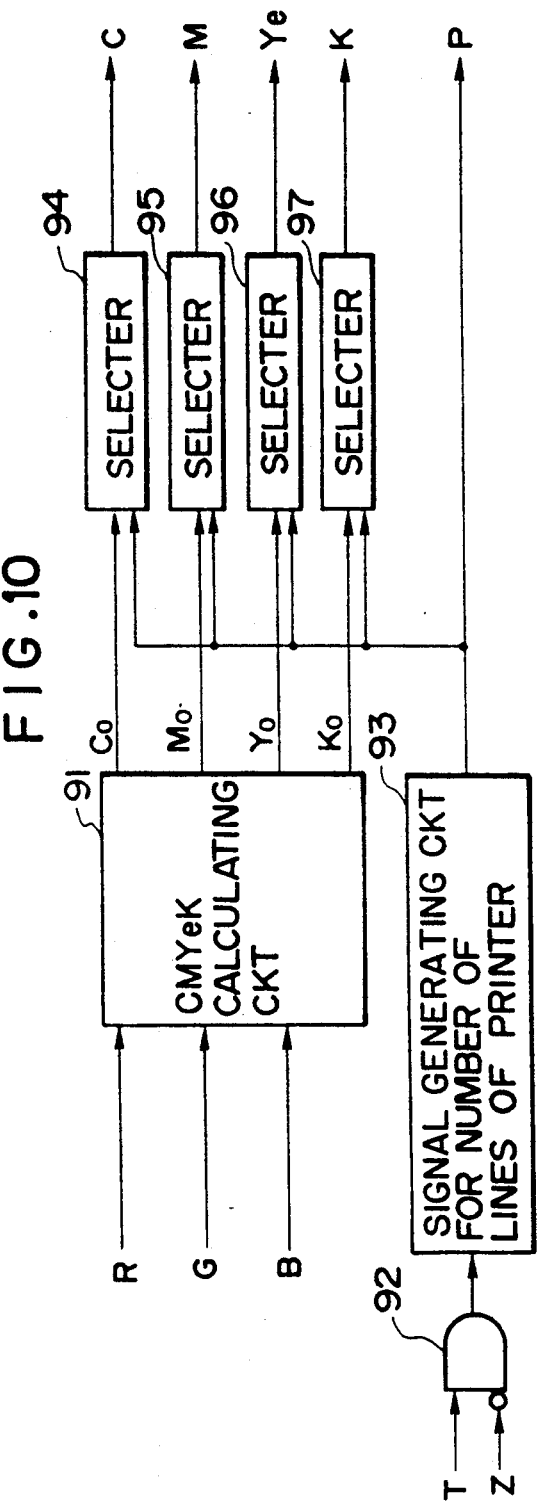
F I G. 10
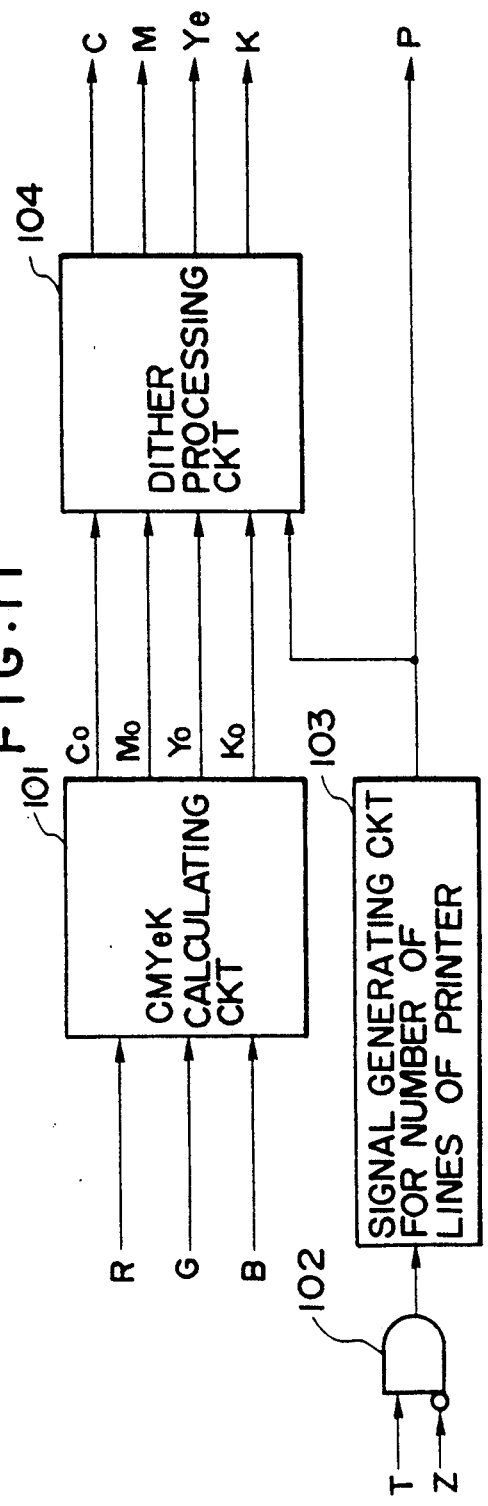
F I G. 11

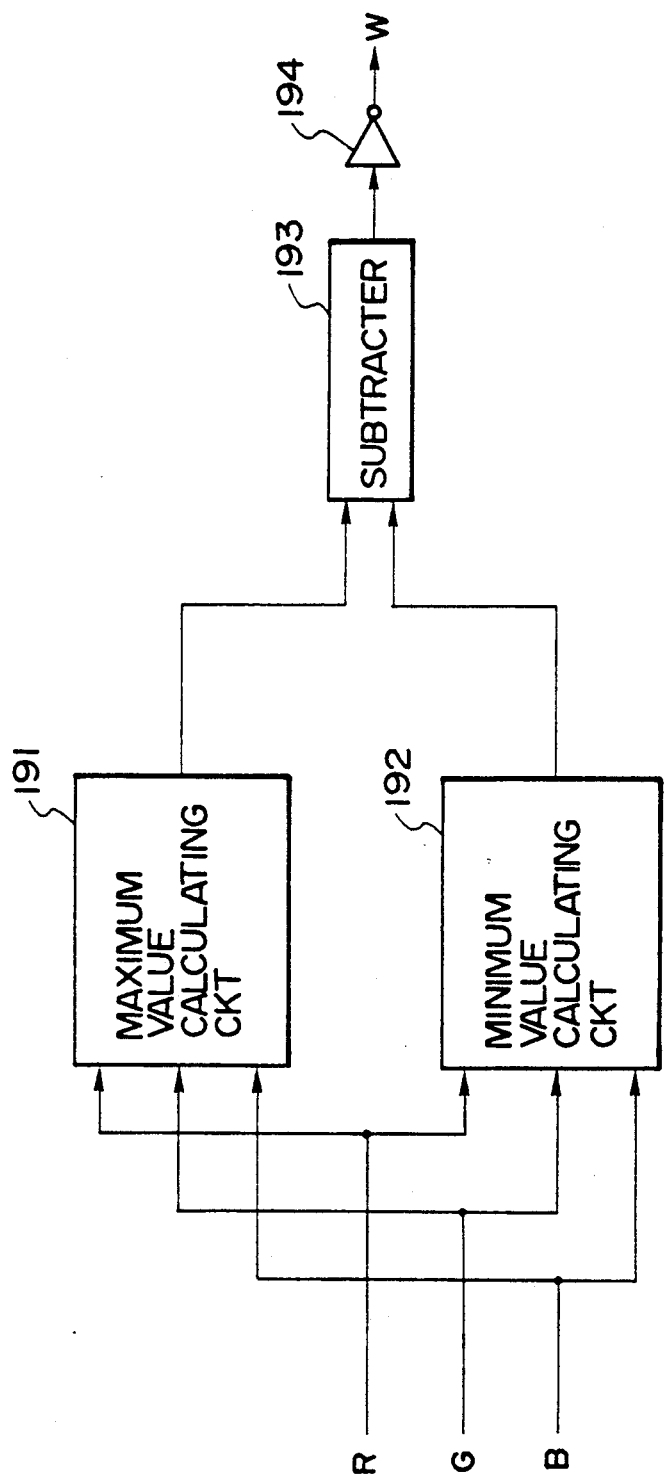

IMAGE FORMING AND PROCESSING APPARATUS WITH IDENTIFICATION OF CHARACTER PORTIONS OF IMAGES

BACKGROUND OF THE INVENTION

1. Field of the Invention

The present invention relates to an image processing apparatus, and more particularly to optimum processing of a color image.

2. Related Background Art

Full-color images have been recently used extensively not only in printing and design offices but also in general business offices. In order to read and output such color images with high fidelity, there have been developed various types of color copying apparatus. Color copying apparatus are required to output a full-color image at high gradation, and also to output a color character document clearly and at high resolution. As a method of outputting a full-color image at a high gradation, there are known a dither method, a screen dot modulation method and the like. If these methods are used for character images or line images, the resolution is considerably degraded and the quality of character is worsened. A binarization process is suitable for fairly reproducing character images and line images. It is well known, however, that if the binarization process is used for screen dot images or photographic images, the gradation and image quality are considerably degraded. Various methods have been proposed to satisfy both character quality and halftone quality. For example, (1) according to Japanese Patent Laid-Open Publication No. 61-11719, character quality is improved by making a black (BK) signal large and making yellow (Y), magenta (M) and cyan (C) signals small, based on the BK signal amplitude calculated from color-separation original Y, M and C signals, so that at the edge portion of a black character, the respective color components are replaced with a black component as much as possible; (2) there is also an attempt to improve character quality by emphasizing all edges or contours of an image without degrading halftone; and (3) according to another method, high resolution image processing and high gradation image processing are selectively used by designating a character area, a screen dot area and a photographic area through manual input by an operator.

With the first method, the contour of a black character can be represented by black color only. However, hairs or eyelashes are sometimes erroneously judged as a black character, or a superposition of yellow, magenta and cyan screen dots is erroneously judged as a black character resulting in formation of an unnecessary black dot. Therefore, the first method is not satisfactory from the image quality viewpoint. With the second method, the sharpness of image is improved. However, since a black character portion is obtained by four-color superposition, color aberration occurs and the character quality is not satisfactory. With the third method, each image area can be processed independently. For example, the image area designated as a black character area is processed with high resolution using only black color, and the color halftone area is processed with excellent halftone. However, an operator is required to precisely designate each image area position, necessitating very complicated operator work.

SUMMARY OF THE INVENTION

It is an object of the present invention to provide an image processing apparatus capable of solving the above-described problems independently from each other or at the same time.

It is another object of the present invention to provide an image processing apparatus as above capable of adequately discriminating between a character portion and a halftone portion of an object image.

It is a further object of the present invention to provide an image processing apparatus capable of adequately discriminating particularly a black character portion of an object image.

According to one preferred embodiment of this invention with the above objects, an image processing apparatus is disclosed which comprises first means for discriminating a black edge portion of an object image, second means for discriminating the color component near the edge portion, and means for judging a characteristic of an object image in accordance with the outputs from the first and second discriminating means.

It is another object of the present invention to provide an image forming apparatus capable of forming an object color image while retaining a high resolution in the character portion or retaining a high gradation in the halftone portion.

It is a further object of the present invention to provide an image forming apparatus capable of properly forming an object color image without color aberration in the black color portion.

According to another preferred embodiment of this invention, a color image forming apparatus is disclosed which comprises means for discriminating a character portion of an object color image; means for forming a color image with changeable resolution; and means for controlling change of the resolution of said color image forming means in accordance with a discrimination result from said discriminating means.

It is a still further object of the present invention to provide an image forming method suitable for use with the color image forming apparatus as above.

The other objects, features and advantages of the present invention will become apparent from the following description of the preferred embodiments, taken in conjunction with the accompanying drawings.

BRIEF DESCRIPTION OF THE DRAWINGS

FIG. 6 shows the black character edge generating circuit shown in FIG. 1;

FIG. 7 shows the image area signal generating circuit shown in FIG. 1;

FIG. 10 is a block diagram showing a black character correcting circuit (for binarization process);

FIG. 11 is a block diagram showing a black character correcting circuit (for dither process);

DETAILED DESCRIPTION OF THE PREFERRED EMBODIMENTS

An image processing apparatus suitable for copying a color image will be described in connection with the following embodiments. However, it is to be noted that the invention is not intended to be limited thereto, but the invention is applicable to various apparatus.

1st Embodiment

Figure 1:
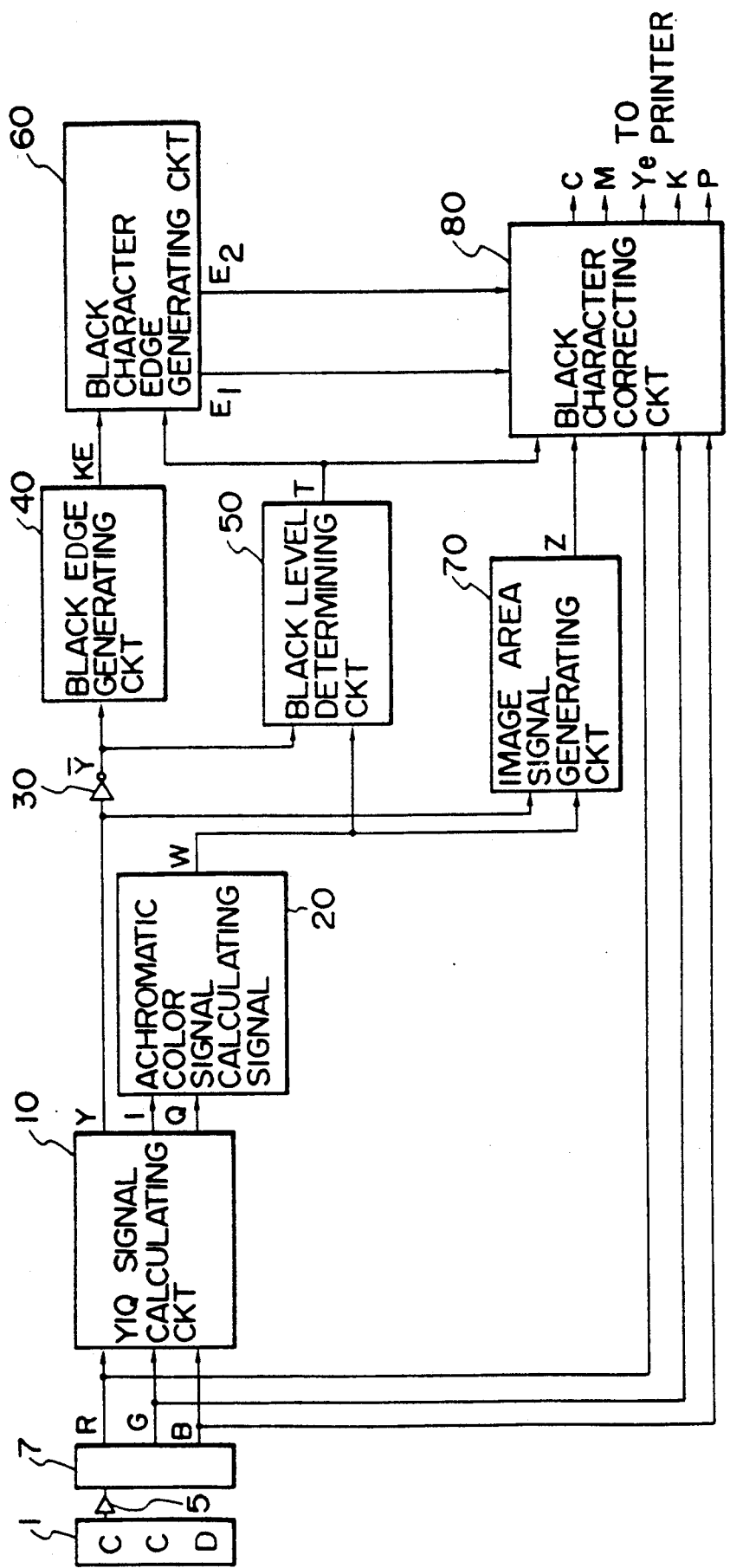
FIG. 1 is a block diagram showing an embodiment of an image processing apparatus according to the present invention.

FIG. 1 is a block diagram showing the circuit arrangement of the image processing apparatus according to the first embodiment of this invention. Red (R), green (G) and blue (B) color signals for one pixel of a color document are read with a color document reader made of a CCD 1 to which a mosaic filter is attached. In this embodiment, CCD 1 outputs a dot sequential color signal which is amplified by an amplifier 5 and color-separated into R, G and B signals at a color separation circuit 7. A YIQ signal calculating circuit 10 calculates a luminance signal Y and color signals I and Q. The luminance signal Y for obtaining a black character edge signal is inverted into a black edge signal $\overline{Y}$ and supplied to a black edge quantity generating circuit 40 whereat a black edge quantity signal KE is outputted by deriving an edge thereof through a Laplacian operator. The I and Q signals representative of a color difference from an achromatic color are inputted to an achromatic color signal calculating circuit 20 which outputs an achromatic color signal W by using a lookup table. The larger the value of W signal becomes, the closer the color is to being achromatic. The W and $\overline{Y}$ signals are inputted to a black level determining circuit 50 whereat the level of a dark achromatic color, i.e., a black, is outputted as a T signal of binary value. A black character edge generating circuit 60 receives the black edge quantity signal KE and generates black character edge signals E1 and E2, in accordance with the black level signal. The E1 signal is used for emphasizing the edge of a black character, and the E2 signal is used for removing color aberration at the black color edge. An image area signal generating circuit 70 judges as an image area (i.e., not a character area) any area having a bright chromatic color and including its vicinity, and outputs an image area determining signal Z. A black character correcting circuit 80 obtains cyan (C), magenta (M), yellow (Ye) and black (K) signals based on the R, G and B signals. Next, the following correction is conducted for those signals in the area with respect to which the image area signal Z is not outputted and the black character edge signals E1 and E2 are outputted. The C, M and Ye signals are each added with E2, and the K signal is added with E1, respectively as their correction signal. The resultant signals are outputted to the next stage output apparatus such as a printer. P represents a printer line number signal which indicates a resolution.

Next, the details of the circuits shown in FIG. 1 will be given.

Figure 2:
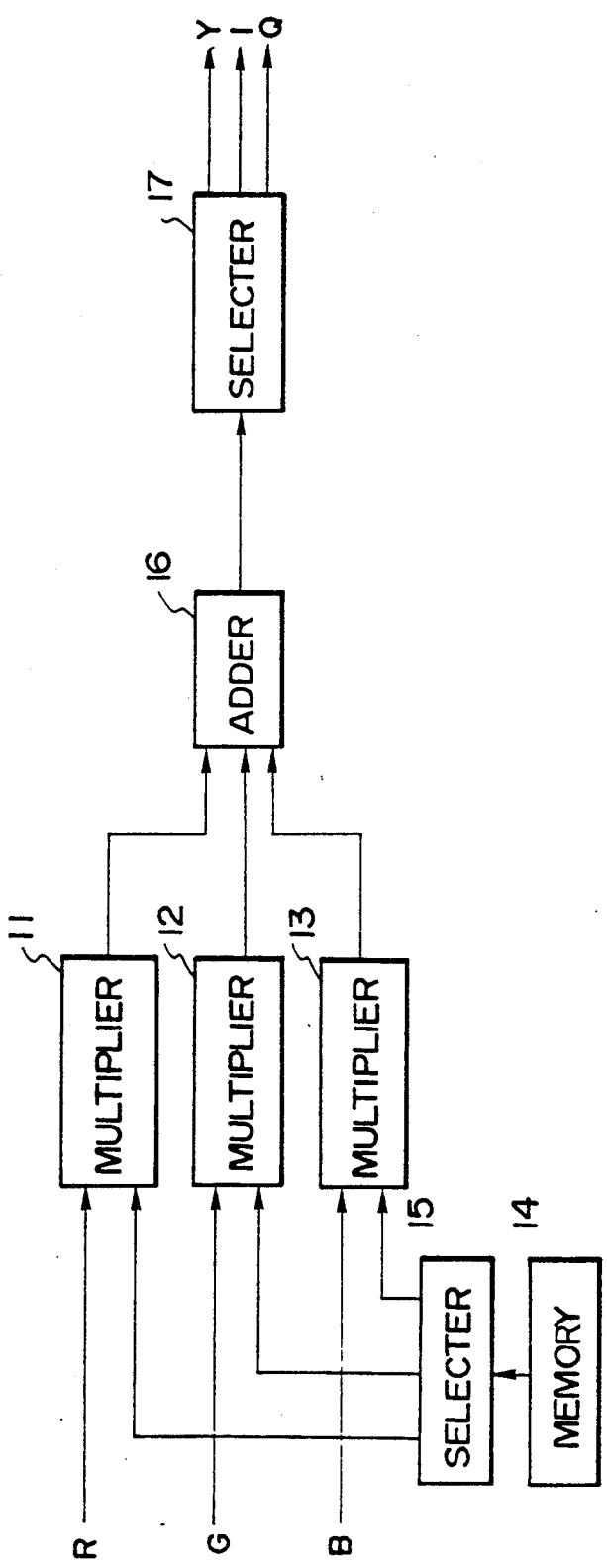
FIG. 2 shows the YIQ signal calculating circuit shown in FIG. 1.

The YIQ signal calculating circuit 10 for receiving R, G and B signals and outputting Y, I and Q signals shown in FIG. 1 will be described with reference to FIG. 2. In FIG. 2, multipliers 11, 12 and 13 each multiply the R, G and B signal by a parameter aij (where i, j=1, 2, 3) which is stored in a memory 14. A selector 15 selects the parameters and sets them at the respective multipliers 11, 12 and 13. An adder 16 adds together the outputs of the multipliers 11, 12 and 13. A selector 17 selectively outputs Y, I and Q signals based on the output from the adder 16. The signal Y is represented by all $\times$R+a12$\times$G+a13$\times$B, the signal I is represented by a21$\times$R+a22$\times$G+a23$\times$B, and the signal Q is represented by a31$\times$R+a32$\times$G+a33$\times$B.

The selector 15 sequentially selects three sets of parameters (all, a12, a13), (a21, a22, a23) and (a31, a32, a33), respectively for the inputted R, G and B signals of one pixel. Therefore, the adder 16 sequentially outputs Y, I and Q signals, respectively for the inputted R, G and B signals of one pixel. The selector 117 selects the sequentially inputted Y, I and Q signals and outputs them onto lines a, b and c, respectively.

Figure 3:
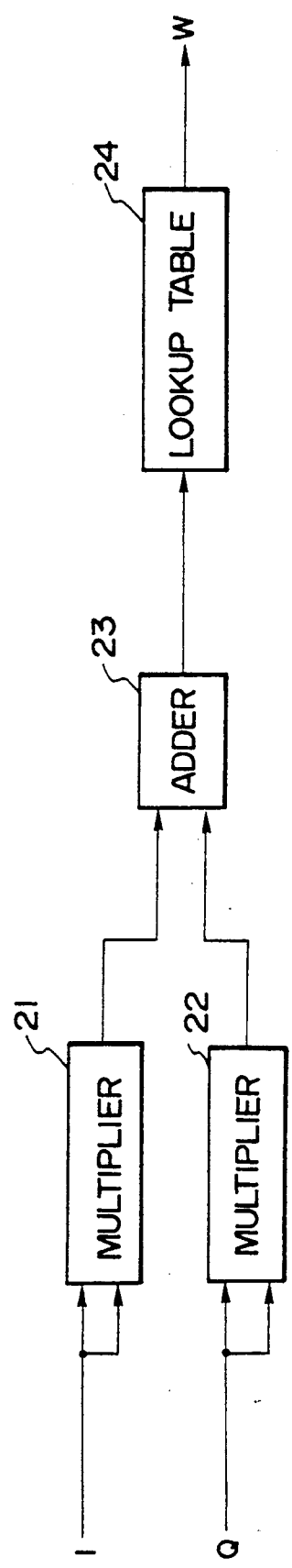
FIG. 3 shows the achromatic color signal calculating circuit shown in FIG. 1.

The details of the achromatic color signal calculating circuit 20 will be described with reference to FIG. 3. A multiplier 21 outputs a square of I, and a multiplier 22 outputs a square of Q. An adder 23 adds together the outputs of the multipliers 21 and 22, and outputs $(I^2+Q^2)$. A lookup table 24 outputs a signal W based on the inputted $(I^2+Q^2)$. The output W is determined by the following equation:

$$W = 255 * \exp\left[-\left(\frac{16}{255}\right)^2 \cdot (I^2 + Q^2)\right]$$

The above-described inverter 30 inverts the signal Y into a signal $\overline{Y}$.

Figure 4:
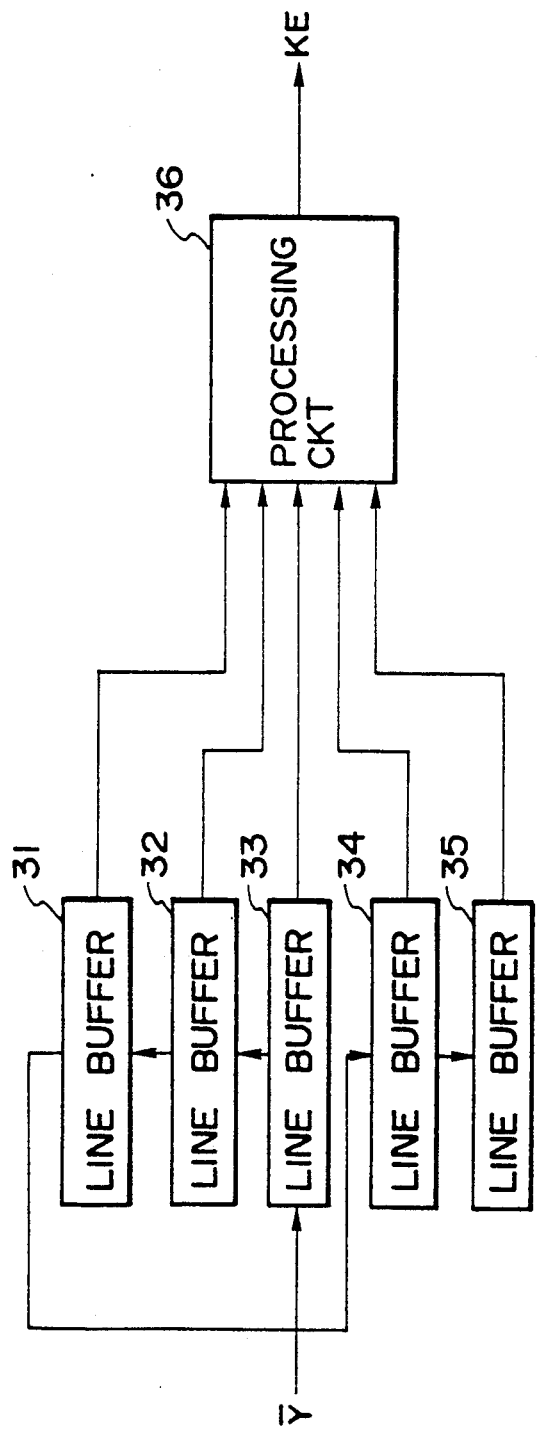
FIG. 4 shows the black edge generating circuit shown in FIG. 1.

The detail of the black edge quantity generating circuit 40 will be described with reference to FIG. 4. Line buffers 31, 32, 33, 34 and 35 are provided for an object pixel and associated peripheral pixels. A processing circuit 36 calculates an edge quantity in the following manner. An object pixel $\times 33$ is represented by $\overline{Y}$, where xij (i, j=1, 2, 3, 4, 5) represents the value stored in the line buffer. The edge quantity is obtained by the following equation:

$$KE = X_{33} - (X_{11} + X_{15} + X_{51} + X_{55})/4$$

Figure 5:
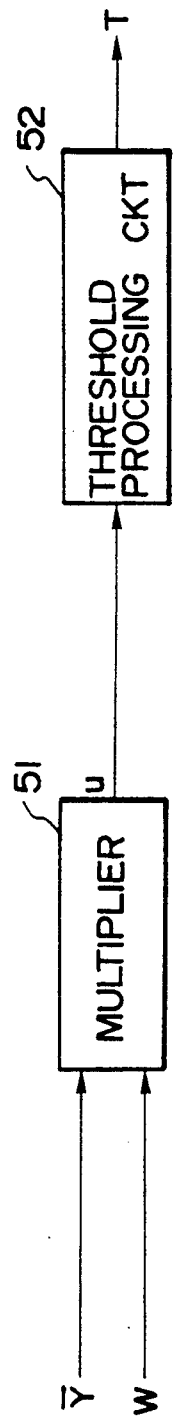
FIG. 5 shows the black level determining circuit shown in FIG. 1.

The detail of the black level determining circuit 50 will be described with reference to FIG. 5. A multiplier 51 multiplies $\overline{Y}$ by W. The output u of the multiplier 51 is supplied to a threshold processing circuit 52 which outputs, as a black level signal T, 0 for u<T0, 1 for T0$\leq$u<T1, 2 for T1<u<T2, and 3 for T2$\leq$u.

The above-described edge signal calculating circuit 60 outputs two edge signals E1 and E2 based on the black edge quantity signal KE from the black edge quantity generating circuit 40 and the black level signal T from the black level determining circuit 50. The detail of the edge signal calculating circuit 60 will be described with reference to FIG. 6. A comparator 61 compares the signal KE with a threshold value stored in a memory 62, and outputs 1 if the signal KE is larger than the threshold value, and outputs 0 if not. A processing circuit 63 calculates the edge signal E1 based on the KE and T signals and an output of the comparator 61. The processing circuit 63 outputs the signal E1=0 if the output of the comparator 61 is 0, and the signal E1=$\alpha_1 \times$KE if the output of the comparator 61 is 1. The constant $\alpha_1$ is optionally determined in accordance with the value of the signal T. A comparator 64 compares the signal KE with a threshold value stored in a memory 65, and outputs 1 if the signal KE is larger than the threshold value, and outputs 0 if not. A processing circuit 66 calculates the edge signal E2 based on the KE and T signals and an output of the comparator 64. The threshold value of 0 is stored in the memory 65. The processing circuit 66 outputs the signal E2=-KE$\times(-1)\times \alpha_2$ if the output of the comparator 64 is 0, and the signal E2=KE$\times \alpha_2$ if the output of the comparator 64 is 1. The constant is optionally determined in accordance with the value of the signal T.

The detail of the image area determining circuit 70 will be described with reference to FIG. 7. A multiplier 71 multiplies the signal Y by the signal W obtained by inverting the signal W, and outputs a signal X. A threshold processing circuit 72 compares and predetermined threshold with the X signal and outputs the comparison result. Line buffers 73, 74 and 75 store the outputs of the threshold processing circuit 72. A determining signal generating circuit 76 reads the values of the object pixel and associated pixels from the line buffers 73, 74 and 75, and determines if the object pixel is within an image area or not. If the object pixel is within the image area, the circuit 76 outputs 1 as the image area signal Z, and outputs 0 if not.

Figure 8:
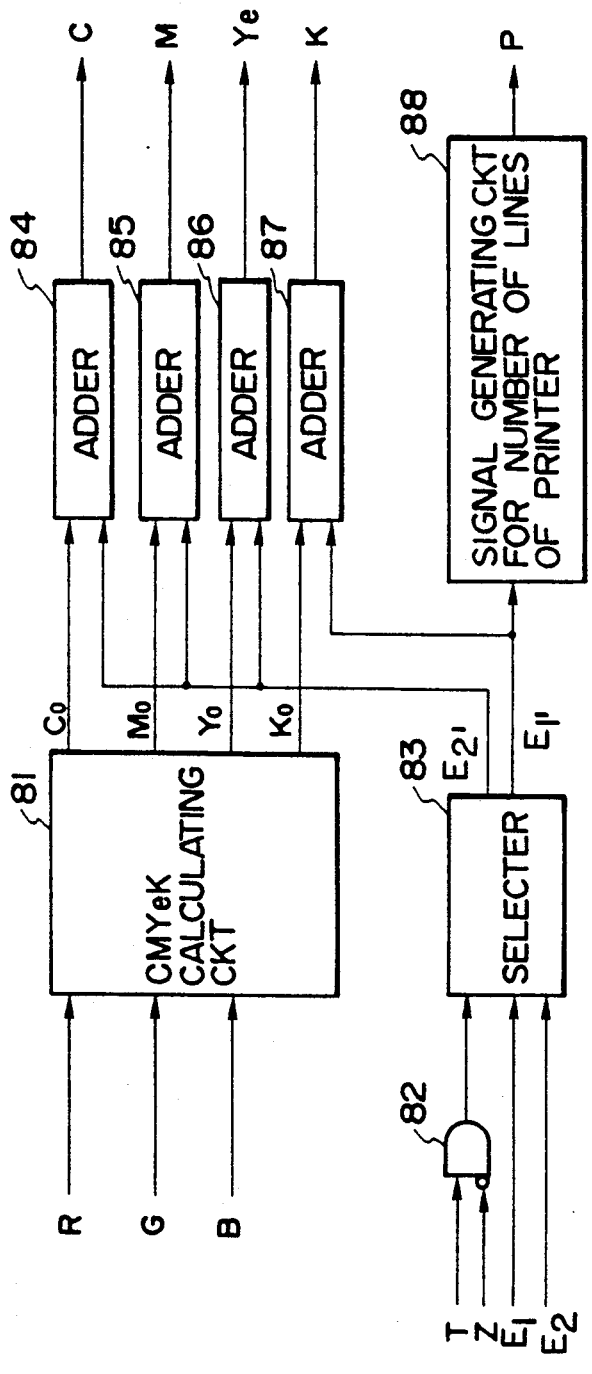
FIG. 8 shows the black character correcting circuit shown in FIG. 1.
Figure 9:
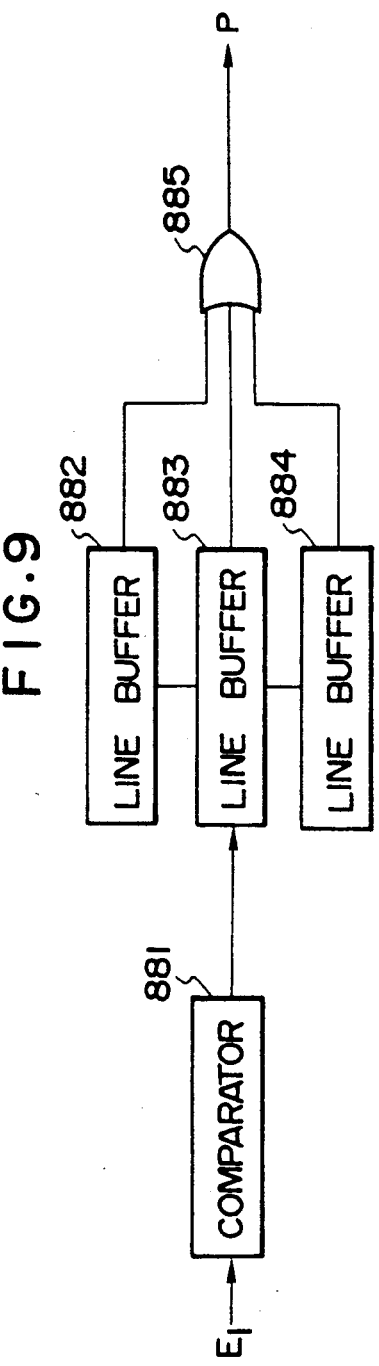
FIG. 9 shows the printer line number generating circuit shown in FIG. 8.

The detail of the black character correcting circuit 80 will be described with reference to FIG. 8. A CMYK calculating circuit 81 calculates cyan (Co), magenta (Mo), yellow (Yo) and black (Ko) signals based on the R, G and B signals by using a known technique. The CMYK calculating circuit 81 includes therein a circuit for converting R, G and B signals into Ye, M and C signals, a color masking circuit, and a circuit for performing a UCR process and outputting the black (Bo) signal. An AND gate 82 receives the black level signal T and image area determining signal Z, and outputs 1 if the black level signal is not 0 and the image area determining signal is 0, and outputs 0 in the other cases. A selector 83 outputs E1'=E1 and E2'=E2 if the output of the gate 82 is 1, and outputs E1'=0 and E2'=0 if the output of the gate 82 is 0. An adder 84 adds together the signal Co and signal E2', an adder 85 adds together the signal Mo and signal E2', an adder 86 adds together the signal Yo and signal E2', and an adder 87 adds together the signal Ko and signal E1'. A printer line number signal generating circuit 88 receives the E1' signal and outputs a printer line number signal P by processing the pixels adjacent the object pixel, the signal P representing a printer output resolution. FIG. 9 shows the detail of the printer line number signal generating circuit 88. A comparator 881 outputs 0 if the E1' signal is 0, and outputs 1 if not. The output 0 stands for a low resolution output, and the output 1 for a high resolution output. Line buffers 882, 883 and 884 store the output of the comparator 881 for the object pixel and associated pixels, e.g., 5×5 pixels. An OR gate 885 outputs 1 indicating that the object pixel is outputted at a high resolution, if any one of the object pixel and associated pixels shows a high resolution output, and in the other case, the OR gate 885 outputs 0. With the above circuit arrangement, it is possible to prevent frequent change of the output of the printer line number signal generating circuit, which will be described later.

Figure 12:
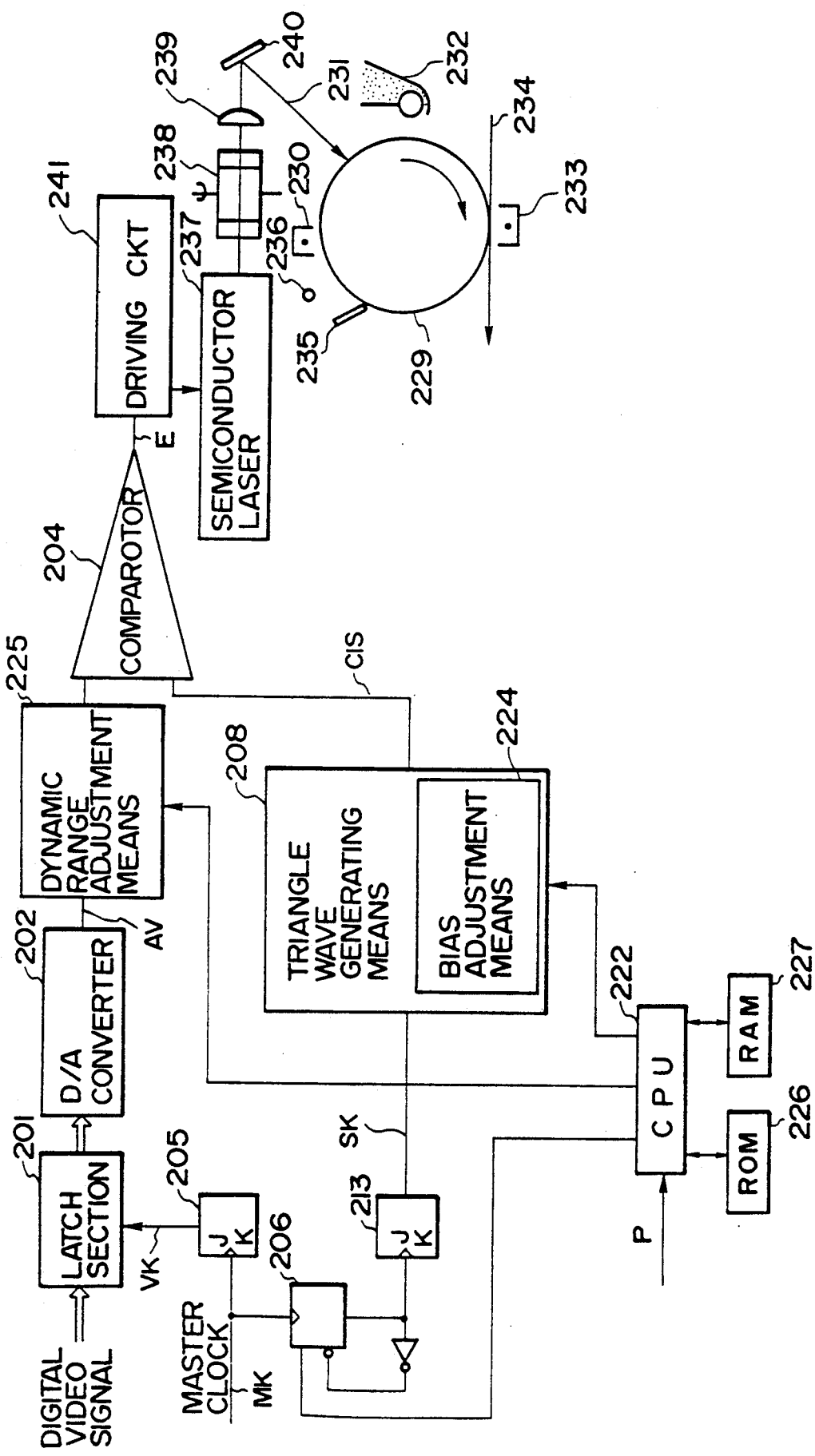
FIG. 12 is a schematic diagram showing an example of a printer.

Shown in FIG. 12 is an example of the image forming apparatus (laser printer) for forming an image by using an image signal outputted from the above-described image processing apparatus. In the embodiment apparatus shown in FIG. 12, the gradation is reproduced by means of a method called PWM modulation. A latch section 201 latches a digital video signal in synchronism with a clock VK obtained by frequency-dividing master clocks at a J/K flip-flop (J/K-FF) 205. A D/A converter 202 converts the latched digital video signal into an analog signal. A dynamic range adjustment means 225 adjusts the dynamic range of an output of the D/A converter. A flip-flop 206 controls the phase of the master clock. Reference numeral 222 represents a CPU. A flip-flop 213 frequency-divides the clocks whose phase was controlled by the flip-flop 206. A triangle wave generating means 208 outputs a triangle wave to serve as what is sometimes referred to herein as a pattern signal, in accordance with an output from the flip-flop 213. A comparator 204 compares the output of the dynamic range adjustment means 225 with the output of the triangle wave generating means 208 which includes bias adjustment means 224 for adjusting the bias of the triangle wave. In this embodiment, the triangle wave generating means can selectively outputs a first triangle wave of relatively high frequency and a second triangle wave having a lower frequency than that of the first triangle wave. Such selection is controlled in accordance with an output from CPU 222 which also controls the other circuits of the apparatus. A ROM 226 stores therein operation programs. A RAM 227 is used as a working area of CPU 222.

Reference numeral 229 represents a drum type electronic photosensitive member rotating in the direction indicated by an arrow. The photosensitive member 229 is uniformly charged by a charger 230. Next, a laser beam 231 modulated to output radiation in response to a modulation signal E outputted from the comparator 204 scans and exposes the photosensitive member 229 in the direction generally perpendicular to the direction of rotation of the photosensitive member 229. An electrostatic latent image formed on the photosensitive member 229 is visualized by a developer 232.

A visualized toner image is transferred on a transfer sheet 234 by means of a transfer charger 233. The transferred image on the transfer sheet 234 is fixed by a fixer (not shown), whereas the remaining toner on the photoconductive member 229 is removed by a cleaner 235. Thereafter, electric charge left on the photosensitive member 229 is removed upon application of light from a lamp 236. The above processes are repeated thereafter.

In this embodiment, Ye, M, C and K toners are prepared to frame-sequentially print four colors, i.e., to form a full-color image.

The laser beam 231 is emitted from a semiconductor laser 237 which is driven by a driving circuit 241 to which a pulse-width-modulation signal A outputted from the comparator 204 is applied. Therefore, emitted from the semiconductor laser 237 is a laser beam 231 which is modulated to operate in response to the modulation signal E.

The laser beam 231 emitted out from the semiconductor laser 237 is scanned by means of a scanner 238 such as a rotary polygon mirror, galvano mirror or the like. A lens 239 focusses the laser beam 231 onto the photosensitive member 229. A mirror 240 is used to reflect the laser beam 231.

Figure 13:
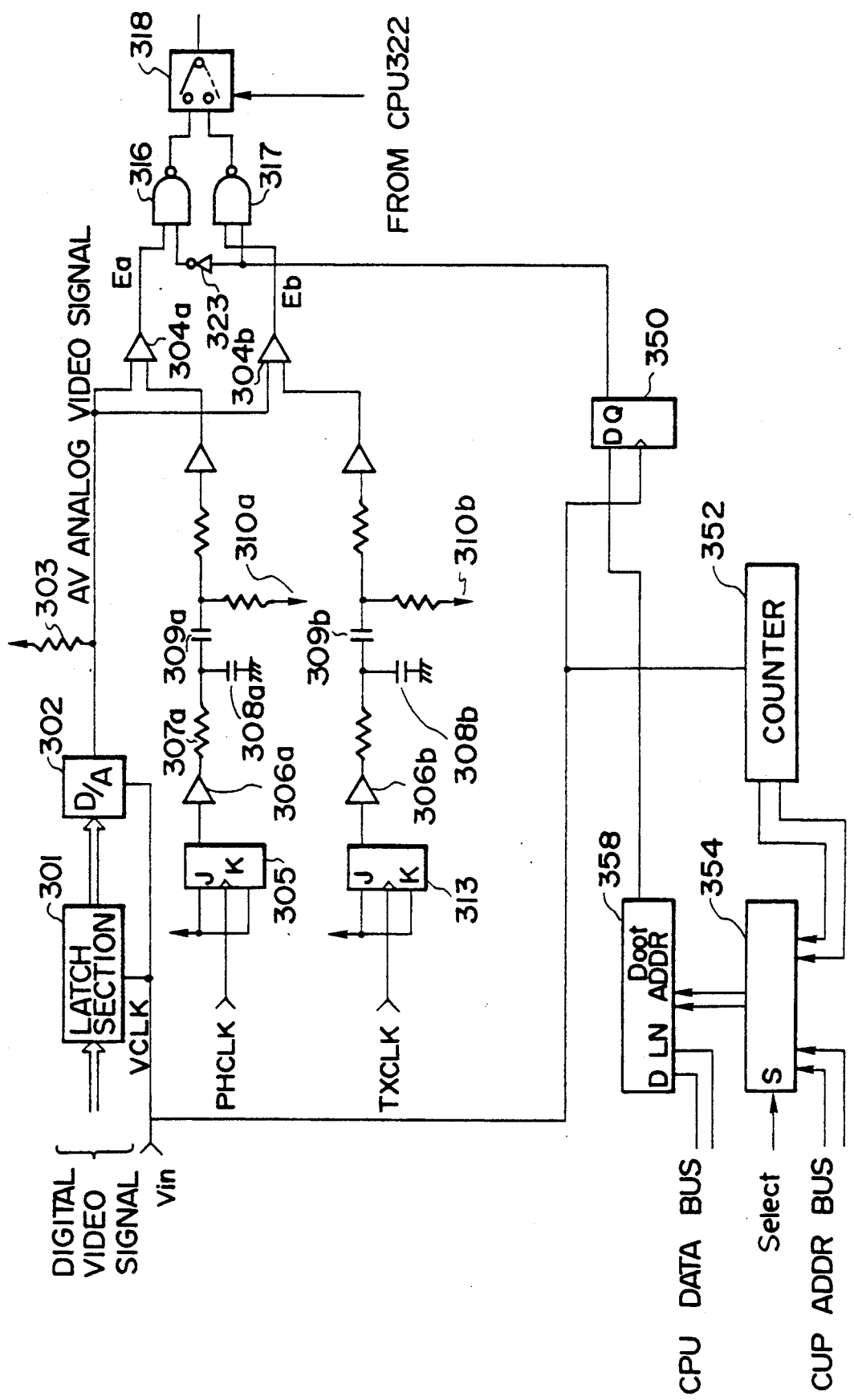
FIG. 13 shows the circuit arrangement of the triangle wave generating means 208 shown in FIG. 12; and FIG .14 is a block diagram showing the circuit arrangement of another embodiment of the achromatic color signal calculating circuit shown in FIG. 1.

FIG. 13 shows another example of the triangle wave generating means 208 and its peripheral circuits shown in FIG. 12, wherein an image is formed through pulse width modulation. A digital video signal Vin from an interface is latched at a latch in synchro with a video clock VCLK. The digital video signal Vin is then converted into an analog video signal AV at a D/A converter 302. An output of the D/A converter 302 is level adjusted by a resistor 303 and supplied to one terminals of two comparators 304a and 304b. In this embodiment, two triangle wave generating means are provided, each being made of an integration circuit. The two triangle wave generating means integrate the outputs of J/K flip-flops 305 and 313 which halve different clocks PHCLK and TXCLK in response to the clock VCLK. The frequency of TXCLK is set at a relatively high frequency a for the purpose of high resolution use, e.g., 400 dpi, whereas the frequency of PHCLK is set at a relatively low frequency b for the purpose of high gradation, e.g., 200 dpi. These frequency divided clocks having a 50% duty ratio are supplied to buffers 306a and 306b and circuits constructed of resistors 307a and 307b and capacitors 308a and 308b, to thereby generate triangle waves whose biases are adjusted by capacitors 309a and 309b and resistors 310a and 310b. The triangle waves are supplied to the other terminals of the comparators 304a and 304b and compared with the analog video signal AV to thus generate two pulse width modulation signals Ea and Eb.

The two signals Ea and Eb are inputted to a switch 318. A selector 318 selects, in accordance with a control signal CIS from a CPU 322, the signal Ea for a character area or the signal Eb for a photograph area (halftone image). Such selection is conducted by CPU 322 operating in synchro with a signal corresponding to the signal P shown in FIG. 1. A selection circuit 354 selects, in accordance with a select signal, either an output from a counter 352 or an address outputted from CPU via an address bus. A circuit 358 outputs a signal to a D-type flip-flop 350 in accordance with the address outputted from the selector and the data outputted from CPU via a data bus.

CPU 322 sets an address and data at the selectors 354 and 358 which select one of the outputs of the comparators 304a and 304b, in accordance with the signal P outputted from the black character correcting circuit 80 shown in FIG. 1.

With the circuit arrangement shown in FIG. 13, CPU can perform a desired correction by selecting one of the outputs from the comparators 304a and 304b in accordance with an output from the black character correcting circuit 80.

In the embodiment shown in FIG. 12, the frequency of the triangle wave outputted from the triangle wave generating means and inputted to the comparator 204 has been changed. However, in the embodiment shown in FIG. 13, two comparators 304a and 304b are provided to select one of the outputs, thereby improving the circuit response.

According to the above-described image forming apparatus, an edge is emphasized for an area judged as a character area, whereas an edge is not emphasized for an area judged as a screen dot color image area. In addition, a frequency a is automatically selected for the purpose of high resolution use for an area judged as a character area, and a frequency b for the purpose of high gradation for an area judged as a color image area. Consequently, the quality of a reproduced image can be further improved.

2nd, Embodiment

The second embodiment of the black character correcting circuit shown in FIG. 1 will be described, wherein a black character processing is performed for an area near a derived character image and line image area having an optional color.

FIG. 10 shows the black character correcting circuit using a binarization process. A circuit 91 calculates cyan (Co), magenta (Mo), yellow (Yo) and black (Ko) signals based on the R, G and B signals by using a known technique. An AND gate 92 outputs 1 if the black level signal T takes a value other than 1 and the image area signal takes a value 0, and output 0 in the other cases. A printer line number determining circuit 93 determines the number of printer lines based on the output of the AND gate 92 for the object pixel and associated pixels. Selectors 94, 95, 96 and 97 output 0, 0, 0 and Ko respectively if the printer line number signal P is 1, and output Co, Mo, Yo and 0 respectively if the signal P is 0.

3rd, Embodiment

The third embodiment of the black character correcting circuit shown in FIG. 1 will be described, wherein a black character processing is performed for an area near a derived character image and line image area having an optional color.

FIG. 11 shows the black character correcting circuit using a binarization process. A circuit 101 calculates cyan (Co), magenta (Mo), yellow (Yo) and black (Ko) signals based on the R, G and B signals by using a known technique. An AND gate 102 outputs 1 if the black level signal T takes a value other than 1 and the image area signal takes a value 0, and outputs 0 in the other cases. A printer line number determining circuit 103 determines the number of printer lines based on the output of the AND gate 102 for the object pixel and associated pixels. A dither processing circuit 104 performs a known dither process if only the output of the printer line number generating circuit 103 is 0 and it passes the inputted signal without processing it if the output of the circuit 103 is 1.

In the above embodiments, a black area is first derived in accordance with the brightness information and chrominance information of a document, and then an edge component of the document is derived to thereby judge the black edge portion. A black character, color image and black fine line within the screen dots are automatically discriminated in accordance with the degree of the black edge and the degree of color information of adjacent pixels. Therefore, without labor of an operator, both a high quality halftone or dots and a high quality black character can be realized.

Specifically, according to the embodiments, in discriminating the characteristic of an object image, not only the high frequency and color components of the object image but also the color components of the adjacent area are detected so that there is no fear of erroneously judging as a black character the black dot area where respective color screen dots are superposed one upon another within a color image made of screen dots. Therefore, a character having an optional color can be discriminated from other image areas such as color image area made of screen dots. It is accordingly possible to suppress color aberration of a black character, reduce the number of erroneous judgements that superposed respective color dots within a color screen dot image are considered as a black character, and improve the quality of a black character considerably. Further, both the characters and color image within one document can be automatically discriminated.

4th Embodiment

In the above-described embodiments, a black character is derived from an image. If a red character is to be derived, as the value of the luminance signal Y, the value of the R signal is outputted from the YIQ calculating circuit. In the above embodiments, the Y signal is obtained using the equation Y=a11×R+ a12×G+a13×B. In this embodiment, the values of parameters are set as a11 =1, a12=0 and a13=0.

The lookup table has been described for obtaining I, Q and W signals at the achromatic color signal calculating circuit. However, the following equation may be used:

$$W = 255 * \exp\left[-\left(\frac{16}{255}\right)^2 \cdot \{(I-a)^2 + (Q-b)^2\}\right]$$

wherein a and b0 are a constant. Other parameters may be used if a signal representing the degree of chromaticity and achromaticity is used.

Another embodiment of the achromatic color signal calculating circuit shown in FIG. 3 will be described with reference to FIG. 14. In FIG. 14, a maximum value calculating circuit 191 detects a maximum value among R, G and B signals, and a minimum value calculating circuit 192 detects a minimum value among R, G and B signals. A subtracter 193 subtracts the minimum value from the minimum value calculating circuit 192, from the maximum value from the maximum value calculating circuit 191. An inverter 194 inverts the output from the subtracter 193 and outputs an achromatic color signal W.

The degree of achromaticity may be judged by various other methods in place of the embodiment method.

In the above embodiment, as a method of detecting a high frequency component of an object image, an edge within the object image has been discriminated. However, the invention is not limited thereto, but a circuit which simply derives the high frequency component from image information may also be used.

As described so far, according to the embodiments, a character area and other image areas can be discriminated. It is accordingly possible to suppress color aberration of a black character, reduce the number of erroneous judgement that superposed respective color dots within a color screen dot image are considered as a black character, and improve the quality of a black character considerably. Further, without labor of an operator, both a character and a color image can be automatically discriminated to thereby provide good operation efficiency.

In the above embodiments, the image area determining circuit shown in FIGS. 1 and 7 has been used as the means for discriminating the color component near an edge. However, the invention is not limited thereto, but other arrangements may be used. For example, another dedicated sensor may be used in addition to CCD 1.

As appreciated from the foregoing description of the embodiments, a character image, line image and color image can be discriminated at high precision and reliability.

We claim:

1. A color image processing apparatus comprising:
   first means for discriminating an edge portion of an object image;
   second means for discriminating a color component near the edge portion; and
   means for judging a characteristic of the object image in accordance with outputs from said first and second discriminating means.

2. A color image processing apparatus according to claim 1, further comprising third means for discriminating a black component of the object image.

3. A color image processing apparatus according to claim 2, wherein said judging means judges the characteristic of the object image in accordance with the outputs from said first and second discriminating means and an output from said third discriminating means.

4. A color image processing apparatus according to claim 3, wherein said judging means further comprises black-edge judging means for judging a black edge portion of the object image in accordance with the outputs from said first and third discriminating means, and judges the characteristic of the object image in accordance with an output from said black-edge judging means and the output from said second discriminating means.

5. A color image processing apparatus according to claim 1, further comprising means for reproducing the object image as a visual image.

6. A color image processing apparatus according to claim 5, wherein said reproducing means changes an image reproducing condition in accordance with a judgment result output by said judging means.

7. A color image processing apparatus according to claim 1, wherein said second discriminating means comprises means for discriminating a color component of a plurality of pixels near an object pixel.

8. A color image processing apparatus comprising:
   first means for detecting a high frequency component of an image signal corresponding to an object image;
   second means for detecting a color component of an area near an object pixel of the object image; and
   means for judging a characteristic of the object image in accordance with detection results output by said first and second detecting means.

9. A color image processing apparatus according to claim 8, wherein the color component is a component representing the degree of chromaticity and achromaticity.

10. A color image processing apparatus according to claim 8, further comprising means for discriminating a black component of the object image.

11. A color image processing apparatus according to claim 10, wherein said judging means judges the object image in accordance with the detection results output by said first and second detecting means and a discrimination result output by said discriminating means.

12. A color image processing apparatus according to claim 8, wherein said judging means judges a character line image area and a screen image area within the object image.

13. A color image processing apparatus according to claim 8, further comprising means for reproducing the object image as a visual image.

14. A color image processing apparatus according to claim 13, wherein said reproducing means changes an image reproducing condition in accordance with a judgment result output by said judging means.

15. A color image forming apparatus comprising:
means for discriminating a black character portion of an object color image to be formed;
means for forming a color image, said color image forming means being able to change a resolution used in color image formation; and
means for controlling the resolution of said color image forming means in accordance with a discrimination result output by said discriminating means.

16. A color image forming apparatus according to claim 15, wherein said controlling means operates, responsive to said discriminating means discriminating the black character portion within the object color image, so as to make the resolution higher than when the black character portion is not discriminated.

17. A color image forming apparatus according to claim 15, wherein said discriminating means further comprises:

first means for discriminating a black component within the object color image; and
second means for discriminating an edge of the black component discriminated by said first discriminating means.

18. A color image forming apparatus according to claim 15, wherein said color image forming means further comprises:
means for supplying an image signal corresponding to the object color image; and
an electrophotography image forming device for forming a visual image corresponding to the image signal supplied by said supplying means.

19. A color image forming apparatus according to claim 18, wherein said image forming device further comprises means for pulse-width-modulating the image signal supplied by said supplying means using a predetermined pattern signal having a frequency controlled by said modulating means, said modulating means being adapted to change the resolution by changing the frequency of the pattern signal.

* * * * *

UNITED STATES PATENT AND TRADEMARK OFFICE
CERTIFICATE OF CORRECTION

PATENT NO. : 5,031,034

DATED : July 9, 1991

INVENTOR(S) : MASATOMO SHIMIZU, ET AL.

It is certified that error appears in the above-identified patent and that said Letters Patent is hereby corrected as shown below:

Title page:

<u>IN [54] TITLE</u>

"IMAGE" should read --COLOR IMAGE--.

<u>SHEET 1 OF 9</u>

FIG. 1, "CALCULATING SIGNAL" should read --CALCULATING CIRCUIT--.

<u>SHEET 2 OF 9</u>

FIG. 2, "SELECTER" should read --SELECTOR-- (all occurrences).

<u>SHEET 6 OF 9</u>

FIG. 10, "SELECTER" should read --SELECTOR-- (all occurrences).

<u>SHEET 7 OF 9</u>

FIG. 12, "COMPAROTOR" should read --COMPARATOR--.

<u>COLUMN 1</u>

Line 1, "IMAGE" should read --COLOR IMAGE--.

UNITED STATES PATENT AND TRADEMARK OFFICE
CERTIFICATE OF CORRECTION

PATENT NO. : 5,031,034
DATED : July 9, 1991
INVENTOR(S) : MASATOMO SHIMIZU, ET AL.

It is certified that error appears in the above-identified patent and that said Letters Patent is hereby corrected as shown below:

COLUMN 3

Line 9, "FIG .14" should read --FIG. 14--.

COLUMN 6

Line 27, "outputs" should read --output--.
Line 68, "focusses" should read --focuses--.

COLUMN 7

Line 3, "wave." should read --wave--.
Line 11, "terminals" should read --terminal--.

COLUMN 8

Line 4, "2nd, Embodiment" should read --2nd Embodiment--.
Line 25, "3rd, Embodiment" should read --3rd Embodiment--.

COLUMN 9

Line 27, "b0" should read --$\underline{b}$--.
Line 54, "judgement" should read --judgments--.

UNITED STATES PATENT AND TRADEMARK OFFICE
CERTIFICATE OF CORRECTION

PATENT NO. : 5,031,034
DATED : July 9, 1991
INVENTOR(S) : MASATOMO SHIMIZU, ET AL.

Page 3 of 3

It is certified that error appears in the above-identified patent and that said Letters Patent is hereby corrected as shown below:

COLUMN 12

Line 11, "electrophotography" should read --electrophotographic--.

Signed and Sealed this

Thirteenth Day of April, 1993

Attest:

STEPHEN G. KUNIN

*Attesting Officer*     Acting Commissioner of Patents and Trademarks